US 11,951,788 B2

(12) United States Patent
Hilbinger et al.

(10) Patent No.: US 11,951,788 B2
(45) Date of Patent: Apr. 9, 2024

(54) BEARING UNIT FOR A SUSPENSION STRUT OF A MOTOR VEHICLE AND METHOD FOR INSTALLING A BEARING UNIT ON A MOTOR VEHICLE BODY PART (71) Applicant: Schaeffler Technologies AG & Co. KG, Herzogenaurach (DE)

(72) Inventors: Jürgen Hilbinger, Neustadt an der Aisch (DE); Jens Dungs, Nuremberg (DE); Harald Kohlmann, Pommersfelden (DE); Gerhard Meyer, Lehrberg (DE); Rainer Lutz, Markt Erlbach (DE); Arno Wolf, Höchstadt (DE)

(73) Assignee: Schaeffler Technologies AG & Co., Herzogenaurach (DE)

( * ) Notice: Subject to any disclaimer, the term of this patent is extended or adjusted under 35 U.S.C. 154(b) by 94 days.

(21) Appl. No.: 17/603,973

(22) PCT Filed: Mar. 20, 2020

(86) PCT No.: PCT/DE2020/100223
§ 371 (c)(1),
(2) Date: Oct. 15, 2021

(87) PCT Pub. No.: WO2020/211897
PCT Pub. Date: Oct. 22, 2020

(65) Prior Publication Data
US 2022/0203790 A1    Jun. 30, 2022

(30) Foreign Application Priority Data
Apr. 18, 2019  (DE) .................... 10 2019 110 231.6

(51) Int. Cl.
*B60G 15/06*        (2006.01)
*B60G 7/04*         (2006.01)
(Continued)

(52) U.S. Cl.
CPC ............. *B60G 15/068* (2013.01); *B60G 7/04* (2013.01); *F16C 19/10* (2013.01); *F16C 27/08* (2013.01);
(Continued)

(58) Field of Classification Search
CPC ........ B60G 2204/418; B60G 2204/128; F16C 2326/05
(Continued)

(56) References Cited

U.S. PATENT DOCUMENTS 9,856,917 B1 *   1/2018  Vidyasagar ......... F16C 33/7886
2010/0014792 A1 * 1/2010  Kellam ................ B60G 15/067
                                              384/196
(Continued)

FOREIGN PATENT DOCUMENTS

CN       102729753 A      10/2012
CN       104364096 A      2/2015
(Continued)

OTHER PUBLICATIONS

Lebrun, Nov. 2003, FR-2839471-A1, Machine Translation of Specification.*
(Continued)

*Primary Examiner* — Paul N Dickson
*Assistant Examiner* — Matthew Joseph Ganci (57) ABSTRACT A bearing unit (1) for a suspension strut (2) of a motor vehicle (3), has at least the following components:
  a guide ring (4) having a guide axis (5) for a wheel spring (6);
  a cap (7) with a damper holder (8) for a damper block (9);
  a bumpstop holder (10) for a bumpstop (11);
  an axial bearing (12) with a bearing pitch circle (13) for supporting the guide ring (4) on the cap (7) and for
(Continued)

low-friction rotation about the guide axis (5) relative to the cap (7). The bumpstop holder (10) is formed integrally by the cap (7).

13 Claims, 2 Drawing Sheets

(51) Int. Cl.
    *F16C 19/10*     (2006.01)
    *F16C 27/08*     (2006.01)
    *F16F 1/38*     (2006.01)

(52) U.S. Cl.
    CPC ...... *F16F 1/3828* (2013.01); *B60G 2204/128* (2013.01); *B60G 2204/418* (2013.01); *B60G 2204/45021* (2013.01); *B60G 2206/72* (2013.01); *F16C 2326/05* (2013.01); *F16F 2230/0041* (2013.01)

(58) Field of Classification Search
    USPC .................................................. 280/124.155
    See application file for complete search history.

(56) References Cited

U.S. PATENT DOCUMENTS

| | | | |
|---|---|---|---|
| 2016/0223023 A1 | 8/2016 | Hyndai | |
| 2016/0243915 A1* | 8/2016 | Bedeau | B60G 15/068 |
| 2016/0280027 A1 | 9/2016 | Bedeau | |
| 2017/0261032 A1* | 9/2017 | Lepine | F16C 19/12 |
| 2017/0368899 A1* | 12/2017 | Hamada | F16F 9/54 |
| 2018/0154724 A1* | 6/2018 | Pniewski | F16F 9/0454 |
| 2018/0154725 A1* | 6/2018 | Pniewski | F16F 9/0454 |
| 2018/0335089 A1* | 11/2018 | Shaikh | G01B 21/16 |
| 2018/0372152 A1* | 12/2018 | Gaultier | F16C 33/3887 |

FOREIGN PATENT DOCUMENTS

| | | | | |
|---|---|---|---|---|
| DE | 19960699 | A1 | 6/2001 | |
| DE | 10062010 | A1 * | 6/2002 | ............ B60G 11/14 |
| DE | 10062010 | A1 | 6/2002 | |
| DE | 102011089000 | A1 | 6/2013 | |
| DE | 102012215911 | A1 | 3/2014 | |
| DE | 102014208321 | A1 | 11/2015 | |
| DE | 102016224439 | A1 | 6/2017 | |
| DE | 102016214179 | A1 * | 2/2018 | ........... B60G 15/067 |
| DE | 102016214179 | A1 | 2/2018 | |
| EP | 1559595 | A1 | 8/2005 | |
| EP | 1849631 | A1 | 10/2007 | |
| FR | 2829818 | A1 | 3/2003 | |
| FR | 2839471 | A1 | 11/2003 | |
| FR | 2839471 | A1 * | 11/2003 | ........... B60G 15/063 |

OTHER PUBLICATIONS

Lebrun, FR-2839471-A1, Nov. 2003, Machine Translation of Specification.*
Steinbock, DE-102016214179-A1, Feb. 2018, Machine Translation of Specification.*
Ericok, Jun. 27, 2002, DE-10062010-A1, Machine Translation of Specification.*

* cited by examiner

BEARING UNIT FOR A SUSPENSION STRUT OF A MOTOR VEHICLE AND METHOD FOR INSTALLING A BEARING UNIT ON A MOTOR VEHICLE BODY PART

CROSS-REFERENCE TO RELATED APPLICATIONS

This application is the U.S. National Phase of PCT Appln. No. PCT/DE2020/100223 filed Mar. 20, 2020, which claims priority to DE 10 2019 110 231.6 filed Apr. 18, 2019, the entire disclosures of which are incorporated by reference herein.

TECHNICAL FIELD

The disclosure relates to a bearing unit for a suspension strut of a motor vehicle, a suspension strut having such a bearing unit for a motor vehicle, a motor vehicle having such a suspension strut, and a method for installing a bearing unit on a body part of a motor vehicle.

BACKGROUND

Various suspension strut bearings are known in the prior art, which are used at the interface between a shock absorber or suspension strut and the body of a motor vehicle. It comprises an axial bearing, so that a low-friction relative rotation between the suspension strut and the body is made possible and, for example, inserted in a steered axle of a motor vehicle, has a positive effect on the steering behavior of the motor vehicle (torque release). For example, such a suspension strut is configured as a MacPherson strut. Use in steered axles of a motor vehicle is particularly advantageous. For example, such a suspension strut bearing is known from DE 199 60 699 A1. Here, an axial bearing is provided between a ring element, referred to there as a guide ring, and a guide ring, referred to there as a housing, wherein the housing here accommodates the upper end of a wheel spring, for example a helical spring, and a damping element that is configured as a bumpstop for the shock absorber end stop. The guide ring (housing) serves as a support for the spring and supports both the spring forces and the bumpstop forces. The guide ring (housing) is supported on a bearing, which is supported on the vehicle body. The bearing is also referred to as a top mount. A piston rod of the suspension strut is fastened in the top mount (bearing) by means of a rubber and metal damper and forms a second (inner) force path, which is decoupled from the aforementioned (first) force path in terms of damping. EP 1 559 595 A1 shows a suspension strut support bearing in a similar configuration, wherein the guide ring and the top mount are combined here as one module.

The two modules, namely the guide ring and the top mount, take up a considerable amount of space, the dimensions of which are dependent on the level of forces, the vehicle weight, and the requirements for noise and vibration damping.

There is an increasing demand that the required installation space be reduced. With regard to the electrification of the drives and the accommodation of drive modules in the wheel arch of a motor vehicle, this aspect is becoming more and more important.

From DE 10 2016 224 439 A1, a suspension strut fastening bearing unit is known, for example in an embodiment according to FIGS. 22 to 24, in which a very low overall height is achieved.

SUMMARY

It is desirable to at least partially overcome the disadvantages known from the prior art. The features can be combined in any technically sensible way, wherein the explanations in the following description and features from the figures, which comprise additional embodiments, can also be used for this purpose.

A bearing unit for a suspension strut of a motor vehicle, has at least the following components:
 a guide ring having a guide axis for a wheel spring;
 a cap with a damper holder for a damper block;
 a bumpstop holder for a bumpstop; and
 an axial bearing with a bearing pitch circle for supporting the guide ring on the cap and for low-friction rotation about the guide axis relative to the cap.

The bumpstop holder may be formed integrally by the cap.

In the following, if the axial direction, radial direction or the circumferential direction and corresponding terms are used without explicitly indicating otherwise, reference is made to the mentioned guide axis. Unless explicitly stated otherwise, ordinal numbers used in the previous and subsequent descriptions are used only for the purposes of clear distinction and do not indicate the order or ranking of the designated components. An ordinal number greater than one does not necessarily mean that another such component must be present.

In the case of the bearing unit proposed here, the guide ring can be designed with a smaller overall volume and cost-effectively due to a smaller volume of material, and the bearing unit as a whole with a smaller overall volume. At the same time, the bearing unit is very easy to handle during assembly and maintenance.

The bearing unit comprises a guide ring having a guide axis for a wheel spring of a suspension strut. The guide axis is often inclined to the orientation of gravity (in use), for example for the desired oblique suspension of the vehicle wheel held by the suspension strut. In one embodiment, the guide axis is oriented normal to the bearing plane that is spanned by the bearing part circle of an axial bearing. In another embodiment, the guide axis is aligned inclined to the bearing plane.

The cap has a damper holder in which a damper block is accommodated or (as a separate component) can be absorbed and is absorbed in use. The damper block as a separate component is loosely inserted or connected to the cap by means of a press connection and/or form fit. The damper block is interposed (at least in use) between the piston rod of the suspension strut and the body of the motor vehicle and thus forms a (second) separate force path. The damper block is often designed and installed separately by the OEMs (original equipment manufacturers; understood in vehicle construction as the brand manufacturer known to end customers) themselves. In order to be able to provide the bearing unit as a (preassemblable) installation unit, it is therefore desirable that the damper block can be installed after all other components of the bearing unit, preferably including the bumpstop, have been installed.

The axial bearing is configured as a plain bearing or roller bearing, for example as an angular contact ball bearing, and is arranged axially between the guide ring and the cap. Thus, the axial bearing lies in a (first) separate force path via which the compression forces of the wheel spring supported on the guide ring are conducted. The above-mentioned bearing pitch circle is, according to the current definition, the diameter on which the ball centers move (in a bearing with spherical bodies) or corresponds to the diameter of the mean support diameter of a support ring surface (in a plain bearing) or the diameter of the mean support diameter of a number of radial support lines (for roller bodies, e.g. tapered rollers). The axial bearing enables low-friction rotation of the guide ring relative to the cap about the guide axis. As stated above, the bearing axis is not necessarily congruent with the guide axis. In one embodiment in the case of a guide axis inclined to the force of gravity, an inclined (connection) surface is formed such that a bearing plane inclined parallel thereto is formed. The axial bearing is then, for example, of a planar design, i.e., with the bearing surface parallel to the connection surface (on the cap side and/or on the guide ring side). In one embodiment, the axial bearing forms a connection surface to the cap, to which the force of gravity is oriented normally and an inclined bearing plane is formed in the bearing surface itself, for example with an inclined (for example, upper) bearing ring of the axial bearing. In one embodiment, an inclined connection surface is combined with an inclined bearing ring. In one embodiment, at least one of the bearing rings is integrated in the cap or in the guide ring.

There is also a bumpstop holder provided in which a bumpstop for the shock absorber end stop is absorbed. In contrast to the usual previously known embodiments, the bumpstop holder is not, however, comprised by the guide ring. Rather, a separate (third) force path is formed, with the bumpstop holder being formed (integrally) by the cap. In FIGS. 22 to 24 of DE 10 2016 224 439 A1, an embodiment is shown in which such a separate (third) force path is also formed. Here, however, it is necessary that the bumpstop holder is designed as a separate cover element, because otherwise the damper block, which is also to be introduced from the side of the bumpstop (in use from below), cannot be installed. This cover element secures and/or supports the damper block in the damper holder downward. This principle of holding the damper block is also adhered to, for example, in the embodiment according to FIGS. 25 to 27 there (without a third force path). Furthermore, embodiments are shown in which the damper element is materially connected to the cap, for example vulcanized, as is known, for example, from the other cited prior art documents.

According to a further aspect, it is proposed here that, depending on the force and rigidity of the cap (in use), the bumpstop forces can only be passed through the cap into the body or additionally absorbed by the damper block. In any case, the bumpstop forces are passed into the body of the motor vehicle separately from the first force path, i.e., not via the guide ring and thus also not via the axial bearing. Because the bumpstop forces according to the usual load specifications are considerably higher than the wheel spring forces, a significant reduction in the bearing forces in the axial bearing and the component forces in the guide ring is achieved and the advantages mentioned above can be achieved.

While the cap integrally comprises the bumpstop holder for the bumpstop, in the case of an inclined guide axis, the direction of the bumpstop forces is nevertheless aligned parallel and against the force of gravity and can thus be absorbed along the damper axis of the damper block. This is advantageous with regard to the direction of force within the bumpstop because the shear force component is minimized there. This design is also advantageous for the design of the bumpstop holder, because primarily forces are to be interpreted along the damper axis or against gravity. This simplifies the geometry and manufacturability, or an optimal design of the bumpstop holder can be designed inexpensively.

According to a further aspect, the damper holder can be configured purely according to the installation space specifications of an OEM (for example with a separate design of the damper block) or also has a predetermined (axially effective) spring stiffness, which influences the damping behavior of the damper block and/or the bumpstop or the third force path.

Overall, this embodiment of the bearing unit results in advantages in terms of costs (for example lower material expenditure and/or manufacturing expenditure) and simplification of installation and a reduction in the number of suppliers are achieved.

In one embodiment, the cap is formed completely or partially from a sheet metal material, for example by means of cold forming, for example deep drawing. The sheet metal material is formed from a steel or aluminum, for example. In one embodiment, the sheet metal material comprises a connection to a body part, for example a so-called dome plate. This body connection is configured for direct connection of the cap to the body part in question, for example, the body connection is a contact surface or compression surface, which is brought into force-transmitting connection with the body part by means of a plurality of nut threads in the cap for receiving an axial screw connection. The body connection is configured for introducing an axial force towards the body part, and preferably also away from the body part, as well as for, for example frictionally engaged, introduction of transverse forces. The sheet metal material is then screwed directly to the body part in contact or in indirect contact via at least one further material layer of the cap, wherein the cap is in direct contact with the body part. The body connection is preferably formed by means of cold forming, for example comprising extrusion and/or stamping.

It is also proposed in an advantageous embodiment of the bearing unit that the cap can be fastened directly to a body part.

In this embodiment it is proposed that between the cap and the corresponding receiving body part, for example the so-called dome plate of the motor vehicle, no further intermediate component is provided, i.e., free of an intermediate component. In one embodiment, an intermediate disk or similar is provided. However, a separately designed damper element is not provided between the cap and the corresponding receiving body part. In one embodiment, the cap is fixed to the corresponding receiving body part, for example screwed, welded and/or positively connected.

It is also proposed in an advantageous embodiment of the bearing unit that the cap and the guide ring form a bearing seal radially outside and/or inside the axial bearing.

In this embodiment it is proposed that the cap and the guide ring form a bearing seal for the axial bearing in a contactless or dragging manner, such that an outflow of lubricant and/or an ingress of splash water and dirt into the bearing space of the axial bearing is reduced or prevented. In one embodiment, at least one of the bearing seals comprises a labyrinth seal, each with at least one axially and/or radially protruding sealing wall on the cap and/or on the guide ring.

It is also proposed in an advantageous embodiment of the bearing unit that the guide ring and the cap are axially connected to one another, preferably snapped together.

In this embodiment, the transport of the bearing unit is facilitated because the bearing unit is designed as a coherent assembly, i.e., as a structural unit. In addition, the construction of the bearing unit is facilitated and the maintenance of the motor vehicle, for example when the motor vehicle is jacked up, as well as driving through potholes in the road surface of a motor vehicle without additional structural elements is possible without the strut falling apart when the load is completely removed. This connection between the cap and the guide ring is at least axially relieved when the vehicle wheel is loaded. The connection prevents at least one (gravity-dependent) automatic dismantling of the axial bearing. In one embodiment, the connection also forms part of a labyrinth seal. In one embodiment (additionally or alternatively), the connection is formed by a snap hook and a mating flange, which (with respect to the guide axis and/or the orientation of gravity in use) are axially positively connected to one another, i.e., overlap one another radially in the supporting region.

It is further proposed in an advantageous embodiment of the bearing unit that the cap comprises an insert made of a metal, wherein the insert has an integrally formed body connection for a direct connection of the bearing unit to a body part, and wherein the body connection is preferably formed by means of cold forming.

In this embodiment, the cap is formed, for example, from a plastic, preferably an injection-molded component.

In one embodiment, the cap is completely or partially produced by means of an additive method, for example 3D printing. In one embodiment, the cap is manufactured as an injection-molded component. In one embodiment, the cap is formed from a composite of different materials, for example reinforcing agents, such as fiber material, and/or with at least one insert, such as a sheet material as shown above. In one embodiment, the cap (with or without an insert) is formed by means of multi-component injection molding, wherein, for example, a reinforcing agent is included in at least one of the plastic components, for example spherical material or short fibers. In one embodiment, at least one of the plastics used is a thermoplastic elastomer.

In one embodiment of the cap in which plastic is included, the plastic or one of the plastics used has rubber-elastic damping properties. In one embodiment, the plastic or the none of the plastics used has/have any rubber-elastic damping properties, but is/are rather configured as the most rigid load-bearing and/or force-conducting structure possible. In one embodiment, at least one component of the bearing unit is formed integrally by means of plastic, for example a bearing ring, a sealing half, a bearing surface and/or a connection, for example a receiving thread or a contact surface for a press fit. The bearing surface or the connection are, for example, part of the damper holder for a damper block and/or part of the bumpstop holder for a bump stop.

Regardless of the embodiment of the cap, a retaining means for a damper block and/or a bumpstop is preferably provided, which forms a transport lock and/or a securing device during installation or maintenance work. Such a retaining means is preferably formed as a form-fit element, for example as a recess and/or elevation for engaging corresponding elements and/or (in the case of rubber-elastic elements) oversize material penetration of the element to be retained.

In one embodiment, the guide ring is formed according to one of the embodiments mentioned above with regard to the cap (with or without further insert), for example different from the cap. The guide ring is preferably formed completely from a plastic free of an insert, preferably as an injection-molded component. In one embodiment, reinforcement means are provided in at least one of the plastics used.

In this respect, reference is made to the above description of manufacturing variants for the cap.

The insert described here is configured for absorbing the forces in the first force path (spring forces) and third force path (bumpstop forces). The insert is, for example, pot-like with a radially outer flange collar for connecting (body connection) the cap to a body part and a radially inner flange collar for forming or stiffening a base of the damper holder and/or a base of the bumpstop holder, wherein preferably the base of the damper holder and the base of the bumpstop holder form the axially opposite sides (in use upper side and lower side) of the insert and of the plastic sheathing attached at least on one side of the insert, respectively. The body part is, for example, a so-called dome plate.

In one embodiment, the insert is formed from a sheet metal material by means of forming, preferably cold forming, for example deep drawing. The sheet material is, for example, steel or aluminum.

The insert preferably only has a radially outer flange for direct force transmission from the cap into the body part in question and no further contact points. For example, the insert has only two radially extending flanges, for example the above-mentioned components of the body connection and the base of the damper mount or the base of the bumpstop holder, and an axially extending portion for connecting the two radial flanges.

It is further proposed in an advantageous embodiment of the bearing unit that the insert of the cap comprises a support funnel, wherein the support funnel has a funnel outer diameter and a funnel inner diameter, wherein the bearing pitch circle is larger than the funnel outer diameter and the funnel outer diameter is larger than the funnel inner diameter.

The support funnel forms the cap or is part of the cap, for example as a plastic-overmolded sheet metal insert. In one embodiment, the support funnel is only a component of an insert which, for example, also forms at least one flange, as mentioned above, for example. In one embodiment, such an insert is designed without a support funnel.

The support funnel has a radial extension and an axial extension (based on the guide axis and/or the orientation of the force of gravity in use). The support funnel thus has a radially outer and (in use) axially higher (upper) edge with a funnel outer diameter and a radially inner and (in use) axially lower (lower) edge with a funnel inner diameter. These radially limiting diameters lie within the bearing pitch circle of the axial bearing, wherein in one embodiment the planes spanned in each case are aligned at an angle to one another. For example, the radially limiting diameters of the support funnel are compared to the amount of the bearing pitch circle. For example, the projection of the bearing pitch circle along a normal to the plane of the radially-limiting diameters is compared to the radially-limiting diameters. A very high rigidity of the cap is thus achieved with a low overall axial height.

The axial overall height is defined as the (mean) axial distance in use along the alignment of gravity between the relevant body part to which the cap is attached and the axial bearing, or more precisely the mean bearing surface, for example the center of the ball in the case of a ball bearing and the center of the supporting lubricant film in the case of a plain bearing. In the case of an inclined axial bearing, i.e., with an inclined guide axis relative to the orientation of gravity in use, the distance in the bearing center must be taken off, so that half the axial height of the axial bearing or the sine value of the relative inclination of the guide axis multiplied by the radius of the bearing pitch circle is added to the minimum axial distance at the highest point (in use) of the support ring surface.

In an alternative embodiment, the outer funnel diameter is greater than the bearing pitch circle, but the inner funnel diameter is less than the bearing pitch circle. Under certain circumstances, this is at the expense of the axial overall height, because the funnel area between the edges is arranged in radial overlap with the axial bearing. However, this embodiment allows a further increase in the axial spring stiffness and a reduction in the susceptibility to plastic deformation of the overall system in the event of an overload. The embodiment results in a force being introduced into the body part, for example the dome plate, as a result of which the bending stress on the dome plate is reduced. This in turn enables a reduction in the overall axial height of the support funnel and/or the cap, so that the overlap-related distance between the axial bearing and the connection plane of the cap to the body can be compensated.

The axial extent of the support funnel is preferably less than its radial extent, particularly preferably the axial extent is less than half the radial extent. Preferably, the support funnel merges into structurally formed components of an insert, for example a flange ring and/or a cylinder ring, by means of a rounding, wherein the rounding is preferably added to the support funnel and then arranged within the radially limiting diameters.

In one embodiment, a body connection is to a body part, for example a dome plate, is formed integrally with the insert, for example in a radially outer flange. The body connection is preferably configured for direct connection of the cap to the relevant body part, for example with a plurality of nut threads for axial screw connection of the cap to the body part.

It is also proposed in an advantageous embodiment of the bearing unit that the cap comprises an insert and the insert is the only separate stiffening element of the cap.

In this embodiment, the cap is designed with a low level of complexity, as a result of which cost advantages are achieved in terms of production expenditure and material expenditure. The embodiment is also advantageous in terms of a clear force transmission, wherein the forces introduced into the cap are always directed into the insert and the flow of force is defined by the shape of the insert. The insert (or the separate stiffening element) is a one-piece and joint-free component, which is preferably formed from a single material, particularly preferably from a single semi-finished product, for example from a sheet metal material, and/or is formed in a one-step or exclusively one-casting molding process.

A stiffening element is to be regarded as separate if it has been manufactured beforehand and/or is formed from a different material such that this material remains unchanged when it is connected to the rest of the material of the cap, i.e., it is not reshaped, not melted and none of it undergoes thermally induced structural change. Nevertheless, a material connection between the insert and the rest of the material of the cap is preferred, for example an adhesive connection. For example, the insert is manufactured in advance as the (only) separate stiffening element from a metal and then encapsulated with a plastic.

Further reinforcement means (integrally formed) in the cap, for example in a plastic encasing the insert, are not excluded. For example, a plastic encasing the insert is formed using a multi-component injection molding process with stiffer and less stiff regions, for example using composite reinforcing agents such as short fibers or beads. Alternatively or additionally, ribs and/or webs are formed in the encased plastic. Preferably, however, the plastic is also free of composite reinforcing means, because the stiffening of the cap by the insert is already sufficient.

It is also proposed in an advantageous embodiment of the bearing unit that the cap comprises an insert made of a metal, wherein the insert has a radial flange for receiving the bumpstop forces from a bumpstop and the radial flange is formed in radial overlap with the damper holder.

The insert is designed, for example, as described above. In this respect, reference is made to the preceding description with regard to the manufacture and materials of the cap, preferably also to the form and function of the insert in use described there.

In this embodiment, the insert forms a base for the bumpstop, which is designed as a radial flange, i.e., as a flange with a radial extension. It is therefore not necessary to provide another separate component to form the bumpstop holder, nor to stiffen the bumpstop holder. In one embodiment, this radial flange is also the base of the damper holder. In one embodiment, this radial flange is configured for (in use) transferring part of the forces of the third force path of the bumpstop through the damper block, i.e., it is designed to be elastically deformable in a non-negligible manner. For example, the radial flange is configured elastically for a two-part third force path as described above.

It is also proposed in an advantageous embodiment of the bearing unit that a damper block can be inserted from the body side into the damper holder and a bumpstop can be inserted from the suspension strut side into the bumpstop holder.

In this embodiment, the damper block can be inserted into the respective holder from (in use) above and the bumpstop from (in use) below. For example, for this purpose, the respective base of the holder, as described above, is formed by the opposite sides of the same section of the cap, which is reinforced, for example, by means of an insert. This allows a simple embodiment of a bearing unit, which can be provided as a (preassembled) installation unit without a damper block. During installation, only the damper block (in use) has to be inserted from above and the piston rod of the suspension strut (in use) connected to the damper block from below through the bumpstop and the cap. In the case of the bearing unit itself, all components are connected to one another at least in a loss-proof manner and can thus be preassembled in an already adjusted manner by the manufacturer.

It is also proposed in an advantageous embodiment of the bearing unit that the damper holder is arranged axially below a connection plane of the cap, wherein the cap is preferably closed off from the connection plane on the body side.

With regard to the axial overall height, the damper holder is defined by the required installation height of a damper block provided for this purpose, possibly minus an axial projection of the damper block on the body side. The installation height of the damper block is usually not the same as the installation height of the damper block, namely in the case of a preloaded installation, the installation height is lower by the desired axial pretensioning path. On the side of the connection plane, however, at least in this embodiment, the damper holder is open for inserting the damper block. The connection plane is formed by the cap and specifically adapted to the body part in question. For example, the connection plane is mathematically flat. In any case, the connection plane is spanned by the points or lines of the connection to the body part and forms between them as a mathematical plane a horizontal (in use) connection plane or a free-form plane with the smallest possible angular change, in which in the points or lines of the connection to the body part such tangents to the connection plane can be formed, to which the connection axis is aligned perpendicularly, i.e., the connection axes at the relevant point are normal to the connection plane. In the case of a screw connection, for example, the connection axis is a screw axis and, in the case of a welded connection, it is a force axis, which is inclined only slightly or not at all to the force of gravity and/or the guide axis.

In a preferred embodiment, the cap (as a whole) is closed off from the connection plane on the body side. The cap therefore has no regions with an extension at least (in use) along the force of gravity towards the body part beyond the connection plane. The cap is therefore formed without elevation on the connection side. This further reduces the overall height and allows the body part to be drawn through or more through parallel to the connection plane than in embodiments that are not designed without elevations. This means that such a body part can be made more rigid or with less material and preferably with a lower axial overall height.

It is further proposed in an advantageous embodiment of the bearing unit that the body connection is arranged in the connection plane of the cap, wherein preferably only the body connection is arranged for transmitting the spring forces to a body part.

The body connection is arranged for directly connecting the cap to the relevant body part, for example with a plurality of nut threads in a sheet material of the cap for receiving an axial screw connection with the body part. The sheet metal material is then screwed directly to the body part in contact or in indirect contact via at least one further material layer of the cap, wherein the cap is in direct contact with the body part. The body connection or the majority of the nut threads as components of the body connection is preferably formed by means of cold forming, for example comprising extrusion and/or stamping, and preferably comprises an extruded bush-like (axial) one-piece reinforcement for a nut thread in each case.

In one embodiment, the cap is formed completely or partially (for example as an insert) from a sheet metal material, for example by means of cold forming, for example deep drawing. The sheet metal material is formed from a steel or aluminum, for example. In one embodiment, the sheet metal material comprises the body connection.

In some previously known embodiments, the spring forces of the suspension strut are conducted into the body via a damper. On the contrary, it is proposed here that the bearing unit be connected directly to the body by means of the body connection, so that the spring forces are introduced directly into the body via the first force path. Furthermore, according to the above description, in one embodiment, part or all of the third force path (of the bumpstop) is routed via the body connection. The second force path is not routed via the body connection, but by means of indirect or direct contact between the body part in question and the damper block.

According to a further aspect, a suspension strut is proposed having a bearing unit according to an embodiment according to the above description, a wheel spring and a piston rod and, wherein the wheel spring is mounted by means of the bearing unit and can be pivoted about the guide axis with reduced friction torque.

According to this advantageous embodiment, the suspension strut is equipped with the bearing unit described above, so that installation space is gained with at least the same functionality with the same specifications, and simple installation and maintenance is achieved. Such a suspension strut can be used, for example, for an off-roader or SUV (sport utility vehicle), such as a BMW X3, Audi Q3 or Mercedes Benz GL but can also be used for smaller or larger vehicles and for vehicles from other OEMs.

According to a further aspect, a motor vehicle is proposed having at least one vehicle wheel, wherein the at least one vehicle wheel is spring-loaded and damped against gravity by means of a suspension strut according to an embodiment according to the above description.

According to this aspect, a motor vehicle is provided with at least one such suspension strut, preferably in the case of a passenger vehicle with a conventional configuration, at least with both steerable wheels. In the case of the suspension strut, a space-saving bearing unit according to an embodiment as described above is used. This frees up space in the wheel arch for additional components and makes it easy to install and maintain. Such a motor vehicle is, for example, a passenger car, for example an off-roader or SUV. Passenger cars are assigned to a vehicle category according to, for example, size, price, weight, and performance, wherein this definition is subject to constant change based on the needs of the market. Current examples of the SUV class are a Toyota Vanguard, a Nissan X Trail, a Jeep Grand Cherokee or a Porsche Cayenne.

According to a further aspect, a method is proposed for installing a bearing unit on a body part of a motor vehicle, wherein the bearing unit has at least the following components:
   a guide ring having a guide axis for a wheel spring;
   a cap with a damper holder for a damper block;
   a bumpstop holder for a bumpstop;
   an axial bearing with a bearing pitch circle for supporting the guide ring on the cap and for low-friction rotation about the guide axis relative to the cap,
wherein the method for installation comprises at least the following steps:
a. assembling at least all of the above-mentioned components of the bearing unit together;
b. after step a., inserting a damper block into the damper holder;
c. after step a., fastening the cap to the body part; and
d. after step b., insertion into and connection to the damper block of a piston rod of a suspension strut.

The method for installation proposed here can also be implemented during maintenance, i.e., as a maintenance method. In this case, a bearing unit is provided which, for example, corresponds to the bearing unit described above, so that the above-mentioned features, in particular with reference to method steps, are the subject matter of the method for installation here, at least for preferred embodiments. In one embodiment the bumpstop holder is not formed integrally by the cap. According to one embodiment, the first, second and third force path are preferably designed as described above. Identical components of the bearing unit mentioned here are, at least with regard to their function, preferably in every respect, identical to the bearing unit described above.

In the particularly simple method for installation proposed here, all the aforementioned, preferably all, components of the bearing unit are first assembled together in step a. so that the entire bearing unit forms a preassembled, preferably already adjusted, structural unit. Only then in step b. is the damper block inserted into the damper holder and, preferably then, in step c. the cap on the body part is fastened, for example screwed. Before or after step c. in a step d. a piston rod is connected to the damper block, and preferably the sequence of step c and step d. is arbitrary, so that in the case of initial assembly, for example, step d. can be carried out first and then step c. and in the case of reassembly during maintenance, for example replacement of the piston rod, the bearing unit can remain attached to the body component, i.e., step c. can be carried out first and then step d. The bumpstop can be inserted before or after step d., for example, the bumpstop can be guided over the piston rod after step d. The piston rod can preferably be connected to the damper block as a preassembled component comprising at least the wheel spring of a suspension strut after the insertion of the bumpstop. For example, the bumpstop can be inserted into the bumpstop holder before step b. The order in which the damper block and the bumpstop are inserted into the respective holder is preferably arbitrary.

In an embodiment according to the bearing unit described above with a bumpstop formed integrally by the cap, step c. is always to be carried out after step b. if, after deformation of the damper block, the latter has too large a remaining minimum diameter for a through hole on the body side because the damper block is to be inserted on the body side.

BRIEF DESCRIPTION OF THE DRAWINGS

The bearing unit described above is explained in detail below based on the relevant technical background with reference to the associated drawings, which show preferred embodiments. The drawings are not necessarily dimensionally accurate and are not suitable for defining proportions. In the figures.

DETAILED DESCRIPTION

Figure 1:
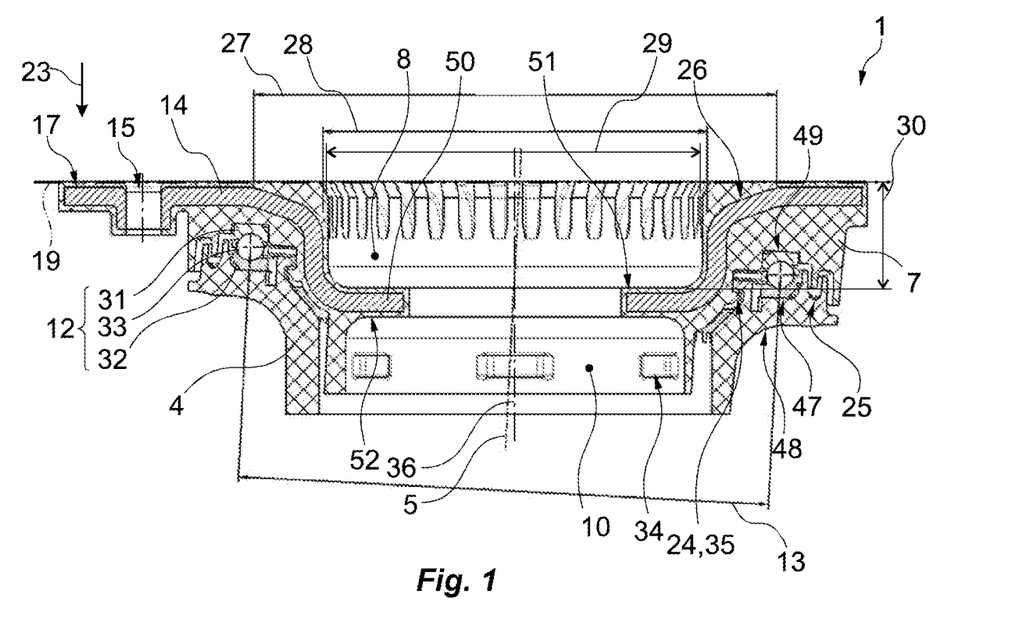
FIG. 1: shows a bearing unit in a sectional view.
Figure 2:
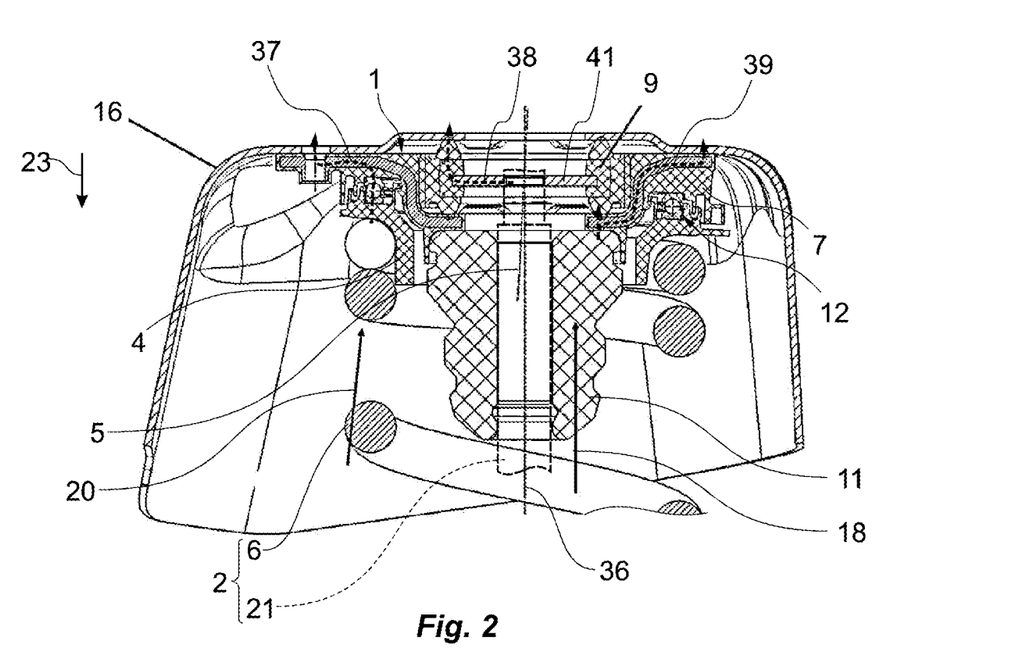
FIG. 2: shows a bearing unit with a suspension strut in a sectional view.

In FIG. 1, a bearing unit 1 is shown in section, wherein here a cap 7 with a (for example steel) insert 14 and a guide ring 4 are connected to one another in such a way that they cannot be lost by means of a snap 35 such that the entire bearing unit 1 shown forms an installation unit. The following description is based on the orientation to the illustrated arrow direction of the force of gravity 23 in use. The guide ring 4 is, for example, a plastic component which has a (first) receiving surface 47 for a lower bearing ring 32 of an axial bearing 12 and a stop surface 48 for absorbing the spring forces 20 of a wheel spring 6 (see FIG. 2). In addition, the guide ring 4 forms the lower half of an outer bearing seal 25 designed as a labyrinth seal and (optionally) an inner bearing seal 24 (at the same time a snap hook of the snap 35). The cap 7 comprises the corresponding opposite half of the outer bearing seal 25 and (optionally) the inner bearing seal 24 (at the same time an undercut of the snap 35). Furthermore, the cap 7 comprises a (second) receiving surface 49 for an upper bearing ring 31, such that, in the state shown, the rolling elements 33 of the axial bearing 12 are positioned captively between the upper bearing ring 31 and the lower bearing ring 32 by means of the snap 35. The cap 7 has a central damper holder 8 for a damper block 9 (see FIG. 2). Below the damper holder 8 a bumpstop holder 10 is provided for a bumpstop 11 (see FIG. 2). The cap 7 is stiffened, for example as a plastic component, by means of an insert 14, for example made of steel. The cap 7 can be directly connected to a body part 16 (see FIG. 2) by means of a body connection 15 (here a threaded hole in a bushing formed integrally with the insert 14). The body connection 15 is formed here in a radially outer flange 17 of the insert 14. Here, the insert 14 simultaneously forms a stiffener of the (first) base 51 of the damper holder 8 as well as the (second) base 52 of the bumpstop holder 10, which are formed on the opposite sides of a radially inner stiffening flange 50 of the insert 14. This leads to the force paths 37, 38, and 39 as shown in FIG. 2 and explained below. The bumpstop holder 10 has a securing device 34 in the form of elevations, by means of which an inserted bumpstop 11 (see FIG. 2) is held captive, so that the bearing unit 1 together with the bumpstop 11 (and preferably with the damper block 9) forms an installation unit that remains in position even when the suspension strut 2 is released (see FIG. 2). In the embodiment shown, the guide ring 4 and the axial bearing 12 are designed with a guide axis 5 that is oriented at an angle to the force of gravity 23 and to the damper axis 36 of the damper block 9 (and here also of the bumpstop 11) and thus to the damper holder 8 and to the bumpstop holder 10.

The insert 14 here (optionally) has a support funnel 26 that has an outer funnel diameter 27 and an inner funnel diameter 28. These diameters 27, 28 are both less than the bearing pitch circle 13 of the axial bearing 12. Furthermore, the damper holder 8 has a holder diameter 29 that is smaller than the bearing pitch circle 13 of the axial bearing 12. In addition, the axial bearing 12 is arranged in an axial overlap with the damper holder 8. The damper height 30 is significantly less than the bearing diameter 13, here for example less than half of the bearing diameter 13.

The radial flange 17 or the plastic layer of the cap 7 on the radial flange 17 spans a connection plane 19 beyond which no components of the bearing unit 1 extend axially (as shown) upward. The bearing unit 1 is thus closed off at the top from the connection plane 19.

In FIG. 2 the bearing unit 1, as shown and explained in FIG. 1, is shown in use arranged on a body part 16, here a dome plate, wherein a suspension strut 2 with a wheel spring 6 and a piston rod 21, a damper block 9 and a bumpstop 11 are also installed. The damper block 9 is shown in a theoretical partially overlapping construction representation, which, in an actual application, leads to rubber-elastic deformation of at least the overlapping regions. The damper block 9 comprises a piston connection 41 (here a steel disk) with which the piston rod 21 is connected in a force-transmitting manner (as rigidly as possible). The conventional second force path 38 is thus formed here. The wheel spring 6 is axially supported on the stop surface 48 (see FIG. 1) of the guide ring 4, so that the first force path 37 for the spring forces 20 results here according to (for the wheel spring 6) an almost conventional type via the axial bearing 12. Here, a third force path 39 is now formed for the bumpstop forces 18 from the bumpstop 11, which (optionally to one part via the damper block 9 and to the other part) is conducted directly via the cap 7 into the body part 16. The third force path 39 thus combines (optionally with the first force path 37 and) with the second force path 38, but is (in any case) routed past the axial bearing 12. While the cap 7 comprises the bumpstop holder 10 for the bumpstop 11, in the case of an inclined guide axis 5, the direction of the bumpstop forces 18 can nevertheless be absorbed parallel and against the force of gravity 23, namely along the damper axis 36.

Figure 3:
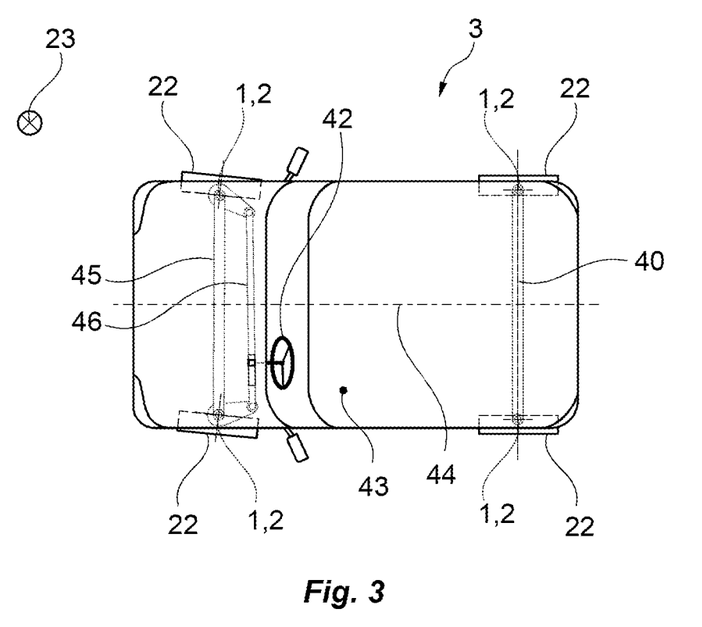
FIG. 3: shows a motor vehicle with suspension struts.

In FIG. 3 a motor vehicle 3 is shown purely schematically with in each case a pair of vehicle wheels 22 on the front axle 45 and a further pair of vehicle wheels 22 on the rear axle 40 from above (direction of the arrow of gravity 23 into the plane of the sheet), wherein on the steered front axle 45 and optionally also on the (non-steered) rear axle 40 for each vehicle wheel 22 in each case a suspension strut 2 is provided, which is mounted on the body of the motor vehicle 3 by means of a bearing unit 1, for example according to the previous description. The front axle 45 is designed to be steerable by means of a steering wheel 42 in the driver's cab 43 with the aid of a steering rod 46, so that when the steering is turned (shown here to the right in the main direction of travel) cornering relative to the longitudinal axis 44 of the motor vehicle 3 is possible.

The bearing unit proposed here makes it possible to construct a suspension strut bearing efficiently and cost-effectively and facilitates simple installation of the bearing unit.

LIST OF REFERENCE SYMBOLS

1 Bearing unit
2 Suspension strut
3 Motor vehicle
4 Guide ring
5 Guide axis
6 Wheel spring
7 Cap
8 Damper holder
9 Damper block
10 Bumpstop holder
11 Bumpstop
12 Axial bearing
13 Bearing pitch circle
14 Insert
15 Body connection
16 Body part
17 Radial flange
18 Bumpstop forces
19 Connection plane
20 Spring forces
21 Piston rod
22 Vehicle wheel
23 Gravity
24 Inner bearing seal
25 Outer bearing seal
26 Support funnel
27 Outer funnel diameter
28 Inner funnel diameter
29 Holder diameter
30 Damper height
31 Upper bearing ring
32 Lower bearing ring
33 Rolling element
34 Securing device
35 Snap
36 Damper axis
37 First force path
38 Second force path
39 Third force path
40 Rear axis
41 Piston connection
42 Steering wheel
43 Driver's cab
44 Longitudinal axis
45 Front axle
46 Steering rod
47 First receiving surface
48 Stop surface
49 Second receiving surface
50 Stiffening flange
51 First base
52 Second base

The invention claimed is:

1. A bearing unit for a suspension strut of a motor vehicle, comprising:
   a guide ring having a guide axis for a wheel spring;
   a cap with a damper holder for a damper block;
   a bumpstop holder for a bumpstop, the bumpstop holder formed integrally with the cap; and
   an axial bearing with a bearing pitch circle for supporting the guide ring on the cap and for low-friction rotation about the guide axis relative to the cap, wherein:
   the cap comprises an insert made of a metal;
   the insert comprises an integrally formed body connection formed by cold forming, the body connection disposed radially offset from the guide axis; and
   the body connection comprises internal nut threads for receiving an axial screw connection thereby forming a direct connection of the bearing unit to a body part.

2. The bearing unit according to claim 1, wherein the insert is the only separate stiffening element of the cap.

3. The bearing unit according to claim 1, wherein the insert has a radial flange for receiving the bumpstop forces from the bumpstop and the radial flange is formed in radial overlap with the damper holder.

4. The bearing unit according to claim 1, further comprising the damper block, wherein a-the damper block can be inserted from thea body side into the damper holder and a bumpstop can be inserted from a suspension strut side into the bumpstop holder.

5. The bearing unit according to claim 1, wherein the damper holder is arranged axially below a connection plane of the cap, and wherein the cap is closed off from the connection plane on a body side.

6. The bearing unit according to claim 5, wherein the body connection is arranged in the connection plane of the cap, and only the body connection is configured for transmitting the spring forces to the body part.

7. A suspension strut for a motor vehicle, having a bearing unit according to claim 1, the wheel spring, and a piston rod and, wherein the wheel spring is mounted by means of the bearing unit.

8. A motor vehicle, having at least one vehicle wheel, wherein the at least one vehicle wheel is mounted in a spring-loaded and damped manner against gravity by means of a suspension strut according to claim 7.

9. A method for installing a bearing unit on a body part of a motor vehicle, wherein the bearing unit comprises:
   a guide ring having a guide axis for a wheel spring;
   a cap with a damper holder for a damper block and an insert comprising an integrally formed body connection comprising internal nut threads, the body connection disposed radially offset from the guide axis;
   a bumpstop holder for a bumpstop; and
   an axial bearing with a bearing pitch circle for supporting the guide ring on the cap and for low-friction rotation about the guide axis relative to the cap; the method comprising:
   assembling the guide ring, cap, bumpstop holder and axial bearing to form the bearing unit;
   after assembling the bearing unit, inserting the damper block into the damper holder;
   after assembling the bearing unit, fastening the cap to the body part with a screw connection into the internal nut threads; and after inserting the damper block, inserting a piston rod of a suspension strut into the damper block and connecting said piston rod to said damper block.

10. A suspension strut comprising:
a guide ring having a guide axis for a wheel spring;
a cap with a damper holder for a damper block and with a bumpstop holder for a bumpstop, the bumpstop holder comprising a securing device with recesses or elevations for holding the bumpstop captive; and
an axial bearing with a bearing pitch circle for supporting the guide ring on the cap and for low-friction rotation about the guide axis relative to the cap, wherein the cap comprises a metal insert having an integrally formed body connection disposed radially offset from the guide axis.

11. The suspension strut according to claim 10, wherein the metal insert simultaneously forms a stiffener for the damper holder and the bumpstop holder.

12. The suspension strut according to claim 10, further comprising:
the damper block inserted from a body side into the damper holder; and
a bumpstop inserted from a suspension strut side, opposite the body side, into the bumpstop holder.

13. The suspension strut according to claim 12, further comprising:
the wheel spring mounted to the guide ring; and
a piston rod fixed to the damper block.

* * * * *